UNITED STATES PATENT OFFICE.

ERNST KRAUSE, OF STEGLITZ, NEAR BERLIN, GERMANY.

MANUFACTURE OF FOOD PREPARATIONS OR EXTRACTS.

1,113,021.     Specification of Letters Patent.     Patented Oct. 6, 1914.

No Drawing.     Application filed January 24, 1914. Serial No. 814,218.

*To all whom it may concern:*

Be it known that I, ERNST KRAUSE, subject of the King of Prussia, residing at 6 Sedanstrasse, Steglitz, near Berlin, in the German Empire, have invented certain new and useful Improvements in the Manufacture of Food Preparations or Extracts, of which the following is a specification.

This invention relates to the manufacture of a food preparation or seasoning extract of good flavor and based upon the utilization of yeast.

It has already been frequently proposed to prepare extracts from yeast by separating the yeast plasma from the yeast cells in a suitable manner either by boiling or by dialysis and then evaporating the same, or by treating the yeast with digesting ferments or by leaving it to autodigestion. These extracts, however, have all a distinctly vegetable taste somewhat similar to bread thereby preventing their use as a meat extract or seasoning extract.

The object of the present invention is to utilize the large quantities of waste blood, blood plasma, blood serum or other blood preparations daily available. It would appear self evident to treat blood in a similar manner to obtain an extract, but if blood, either defibrinated or not, is merely evaporated suitable extracts are not obtained, since the albumen is then obtained in a coagulated form which does not correspond to the desired extract form. It has therefore been already proposed to subject blood to a digesting process so as to obtain extracts in this manner capable of being evaporated and concentrated, but this method has not led to satisfactory results, since if the constituents of blood are to be really split up an energetic chemical action is necessary in the form of temperature and pressure in the presence of acids.

The pepsin digestion of blood is not suitable in practice since even in the case of a long action of the pepsin and hydrochloric acid only inconsiderable quantities of the constituents of blood are split up.

The applicant has now found that the constituents of blood can be sufficiently split up if the blood is not subjected alone to the pepsin digestion, but admixed with yeast, and although blood alone during pepsin digestion yields only inconsiderable quantities of extract it has been found that, by the simultaneous pepsin digestion of yeast and blood, the blood yields about the same percentage of extract as the yeast. The blood may be employed either in its original state or it may be defibrinated and instead of blood any other animal albumen or the serum or plasma of blood or other blood preparations may be employed. The yeast can be used either without further preparation or it may be prepared by separating the plasma from the cells in the known manner. The extract thus obtained has a distinct animal character even when comparatively small quantities of blood are employed and may be utilized as a seasoning extract in the place of meat extracts. It will of course be understood that instead of the pepsin digestion any other fermentative or equivalent chemical methods may be employed.

It is already known that yeast exerts a digesting action upon animal albuminous substances, but it was hitherto not known that the action upon blood would be so extensive or so considerably facilitate the further digestion of the blood as has now been found, since blood alone is comparatively unacted upon by decomposing ferments as above described.

The following example is given of the method of carrying out the present invention: 10 hectoliters of brewer's yeast having about 16–17% dry substance are mixed with 50 to 60 kgs. of salt, whereupon fluidity occurs; 5 hectoliters of fresh blood are then added and the mixture treated with about 5 kgs. of a suitable digesting liquid, for example pepsin extract, being at the same time slightly acidulated. The mixture is then kept at a temperature of 40 to 50° C. for 4 or 5 hours, the resulting liquid being boiled, filtered and evaporated to the desired consistency of the extract.

I claim:

1. The method of manufacturing a food preparation or extract which consists in mixing animal albumen and yeast and subjecting the mixture to destructive digestion.

2. The method of manufacturing a food preparation or extract which consists in mixing blood and yeast and subjecting the mixture to a destructive digestion.

3. The method of manufacturing a food preparation or extract which consists in mixing the albuminous constituents of blood and yeast and subjecting the mixture to a destructive digestion.

4. The method of manufacturing a food preparation or extract which consists in mixing albuminous blood preparations and yeast and subjecting the mixture to a destructive digestion.

5. The method of manufacturing a food preparation or extract which consists in mixing defibrinated blood and yeast and subjecting the mixture to a destructive digestion.

6. The method of manufacturing a food preparation or extract which consists in separating the plasma from the cells of yeast, mixing said plasma with animal albumen and subjecting the mixture to destructive digestion.

7. The method of manufacturing a food preparation or extract which consists in mixing animal albumen and yeast and subjecting the mixture to a fermentative digestion.

8. The method of manufacturing a food preparation or extract which consists in mixing animal albumen and yeast and subjecting the mixture to pepsin digestion.

9. The method of manufacturing a food preparation or extract which consists in mixing salt with yeast, adding animal albumen thereto, acidulating the mixture, treating the mixture with a digesting agent, and thereupon boiling, filtering and evaporating it to the desired consistency.

10. As new articles of manufacture, food preparations or extracts prepared from yeast and animal albumen, characterized by their distinctly animal taste.

In testimony whereof I have affixed my signature in presence of two witnesses.

ERNST KRAUSE.

Witnesses:
 WOLDEMAR HAUPT,
 HENRY HASPER.